(12) United States Patent
Sheridan et al.

(10) Patent No.: US 9,410,448 B2
(45) Date of Patent: Aug. 9, 2016

(54) AUXILIARY OIL SYSTEM FOR NEGATIVE GRAVITY EVENT

(75) Inventors: William G. Sheridan, Southington, CT (US); Paul H. Dolman, Simsbury, CT (US)

(73) Assignee: UNITED TECHNOLOGIES CORPORATION, Hartford, CT (US)

( * ) Notice: Subject to any disclaimer, the term of this patent is extended or adjusted under 35 U.S.C. 154(b) by 913 days.

(21) Appl. No.: 13/484,662

(22) Filed: May 31, 2012

(65) Prior Publication Data

US 2013/0319798 A1 Dec. 5, 2013

(51) Int. Cl.
*F01D 25/20* (2006.01)
*F16N 7/40* (2006.01)
*F01M 11/06* (2006.01)

(52) U.S. Cl.
CPC ............ *F01D 25/20* (2013.01); *F01M 11/067* (2013.01)

(58) Field of Classification Search
CPC .................................. F01D 25/20; F16N 7/40
USPC ........................................................ 184/6.11
See application file for complete search history.

(56) References Cited

U.S. PATENT DOCUMENTS

| 4,153,141 | A |   | 5/1979  | Methlie          |
|-----------|---|---|---------|------------------|
| 4,170,873 | A | * | 10/1979 | Milo ............................ 60/39.08 |
| 4,976,335 | A | * | 12/1990 | Cappellato .................... 184/6.4 |
| 6,463,819 | B1 | * | 10/2002 | Rago ............................. 184/6.2 |
| 7,377,110 | B2 |   | 5/2008  | Sheridan et al. |
| 7,387,189 | B2 | * | 6/2008  | James et al. ................. 184/6.11 |
| 8,230,974 | B2 | * | 7/2012  | Parnin ........................... 184/6.11 |
| 2005/0000753 | A1 | * | 1/2005 | Sheridan ..................... 184/55.1 |
| 2005/0034924 | A1 | * | 2/2005 | James et al. .................. 184/6.4 |

(Continued)

FOREIGN PATENT DOCUMENTS

| DE | 102004056295 | 6/2006 |
| DE | 102006057202 | 6/2008 |
| GB | 2225817 | 6/1990 |
| WO | 0235064 A1 | 5/2002 |

OTHER PUBLICATIONS

International Search Report and Written Opinion for International Application No. PCT/US2013/040735 completed on Oct. 11, 2013.

(Continued)

*Primary Examiner* — William E Dondero
*Assistant Examiner* — Mark K Buse
(74) *Attorney, Agent, or Firm* — Carlson, Gaskey & Olds, P.C.

(57) ABSTRACT

A lubrication system includes a bearing compartment. A main reservoir is fluidly connected to the bearing compartment by a main supply passage. A main pump is arranged in the main supply passage configured to provide fluid from the main reservoir to the bearing compartment during a positive gravity condition. A secondary supply passage fluidly connects the main reservoir to at least one segment of the main supply passage, thereby providing fluid from the main reservoir to the bearing compartment during a negative gravity condition. A method of supplying a bearing compartment with fluid includes pumping a fluid from a main reservoir to a bearing compartment through a main supply passage during a positive gravity condition, and providing fluid from the main reservoir to the bearing compartment through a secondary supply passage, fluidly connected to at least one segment of the main supply passage, in response to a negative gravity condition.

10 Claims, 8 Drawing Sheets

(56) References Cited

U.S. PATENT DOCUMENTS

| | | | |
|---|---|---|---|
| 2008/0116009 A1* | 5/2008 | Sheridan et al. | 184/6.4 |
| 2009/0101444 A1* | 4/2009 | Alecu | 184/11.2 |
| 2010/0212281 A1 | 8/2010 | Sheridan | |
| 2010/0294597 A1 | 11/2010 | Parnin | |
| 2011/0108360 A1* | 5/2011 | DiBenedetto | 184/6.11 |

OTHER PUBLICATIONS

International Preliminary Report on Patentability for PCT Application No. PCT/US2013/040735, mailed Dec. 11, 2014.

European Search Report for Application No. 13797647.8 dated Apr. 4, 2016.

* cited by examiner

FIG.8

AUXILIARY OIL SYSTEM FOR NEGATIVE GRAVITY EVENT

BACKGROUND

This disclosure relates to a lubrication system, and more particularly, to a lubrication system for a fan drive gear system in gas turbine engines.

In many gas turbine engines, a low pressure spool includes a low pressure turbine connected to and driving a low pressure compressor, and a high pressure spool includes a high pressure turbine connected to and driving a high pressure compressor. A main pump is typically driven by the high pressure spool, connected through gearing, and is used to pump lubricating and cooling fluid to all engine components that require lubrication and cooling.

The main pump typically pumps fluid from a passage connected to a main reservoir that holds both liquid and air. During normal operating conditions, the fluid settles at the bottom of the main reservoir and displaces air to the top. However, in a gas turbine engine mounted on an aircraft, the main reservoir may experience "negative gravity" conditions such as the aircraft turning upside down, the aircraft accelerating toward the Earth at a rate equal to or greater than the rate of gravity, or the aircraft decelerating at the end of a vertical ascent. Under negative gravity conditions, the fluid in the main reservoir can rise to the top, which can expose an opening of the passage to air and interrupt the supply of fluid to the main pump and, consequently, interrupt supply to the engine components. Certain engine components, such as gears and bearings, can be damaged by a relatively short period of non-lubricated operation during negative gravity conditions.

In some gas turbine engines, a fan at the front of the engine is connected to the low pressure spool through a fan drive gear system. When the high pressure spool stops rotating or rotates at a reduced rpm (revolutions per minute), the fan drive gear system can continue rotating even though the main pump will ordinarily provide little or no fluid during this time. For example, wind may rotate the fan and corresponding gears and bearings while the aircraft is parked on the ground or during an in-flight engine shutdown. Certain gears and bearings can also be damaged by a relatively short period of non-lubricated operation during windmilling as well.

SUMMARY

In one exemplary embodiment, a lubrication system for a gas turbine engine includes a bearing compartment. A main reservoir is fluidly connected to the bearing compartment by a main supply passage, which includes one or more passage segments therein. A main pump is arranged in the main supply passage configured to provide fluid from the main reservoir to the bearing compartment during a positive gravity condition. A secondary supply passage fluidly connects the main reservoir to at least one segment of the main supply passage, thereby providing fluid from the main reservoir to the bearing compartment during a negative gravity condition.

In a further embodiment of any of the above, the main reservoir includes upper and lower portions. The main supply passage is in fluid communication with the lower portion, and the secondary supply passage is in fluid communication with the upper portion.

In a further embodiment of any of the above, the system includes a first check valve arranged in the secondary supply passage fluidly between the main reservoir and the main supply passage.

In a further embodiment of any of the above, the system includes a bleed passage that is fluidly connected to the secondary passage and is configured to bypass the first check valve.

In a further embodiment of any of the above, the main reservoir includes a vent having a pressure valve that is configured to maintain a desired pressure in the main reservoir and open the first check valve in the negative gravity condition.

In a further embodiment of any of the above, the desired pressure is at least 20 psia (137.90 kPa).

In a further embodiment of any of the above, the system includes a second check valve in the main supply passage and is arranged upstream from an intersection of the main supply passage with the secondary supply passage.

In a further embodiment of any of the above, the bearing compartment includes a sump, and a scavenge pump that fluidly connects the sump to the main reservoir.

In a further embodiment of any of the above, the system includes an auxiliary reservoir and an auxiliary pump that is fluidly connected between the auxiliary reservoir and the bearing compartment via an auxiliary passage.

In a further embodiment of any of the above, the system includes a shuttle valve that interconnects the auxiliary passage and the main supply passage and is arranged upstream from the auxiliary and main pumps.

In a further embodiment of any of the above, the system includes a check valve that is provided in the main reservoir selectively movable in response to the positive and negative gravity conditions.

In a further embodiment of any of the above, the main supply passage includes an ejector that is fluidly connected to the secondary supply passage at an ejector throat.

In another exemplary embodiment, a method of supplying a bearing compartment with fluid includes the steps of pumping a fluid from a main reservoir to a bearing compartment through a main supply passage, which includes one or more passage segments therein, during a positive gravity condition, and providing fluid from the main reservoir to the bearing compartment through a secondary supply passage, fluidly connected to at least one segment of the main supply passage, in response to a negative gravity condition.

In a further embodiment of any of the above, the providing step includes flowing fluid past a first check valve arranged in the secondary supply passage.

In a further embodiment of any of the above, the pumping step includes flowing fluid past a second check valve in the main supply passage.

In a further embodiment of any of the above, the providing step includes pressurizing the main reservoir to open the first check valve.

In a further embodiment of any of the above, the pumping step includes bleeding a fluid past the first check valve to fill the secondary supply passage.

BRIEF DESCRIPTION OF THE DRAWINGS

The disclosure can be further understood by reference to the following detailed description when considered in connection with the accompanying drawings wherein.

DETAILED DESCRIPTION

In general, the disclosure relates to a pump system for lubricating bearings in a fan drive gear system. The pump system includes a main pump for supplying lubricating fluid, such as oil, during ordinary engine operating conditions, an auxiliary pump for supplying the fluid when the main pump loses pressure, and a valve for selecting between the two. The pump system also includes a sump for supplying the fluid to the auxiliary pump during windmill conditions, an auxiliary reservoir for supplying the fluid to the auxiliary pump during zero and negative gravity conditions, and another valve for selecting between those two.

Figure 1:
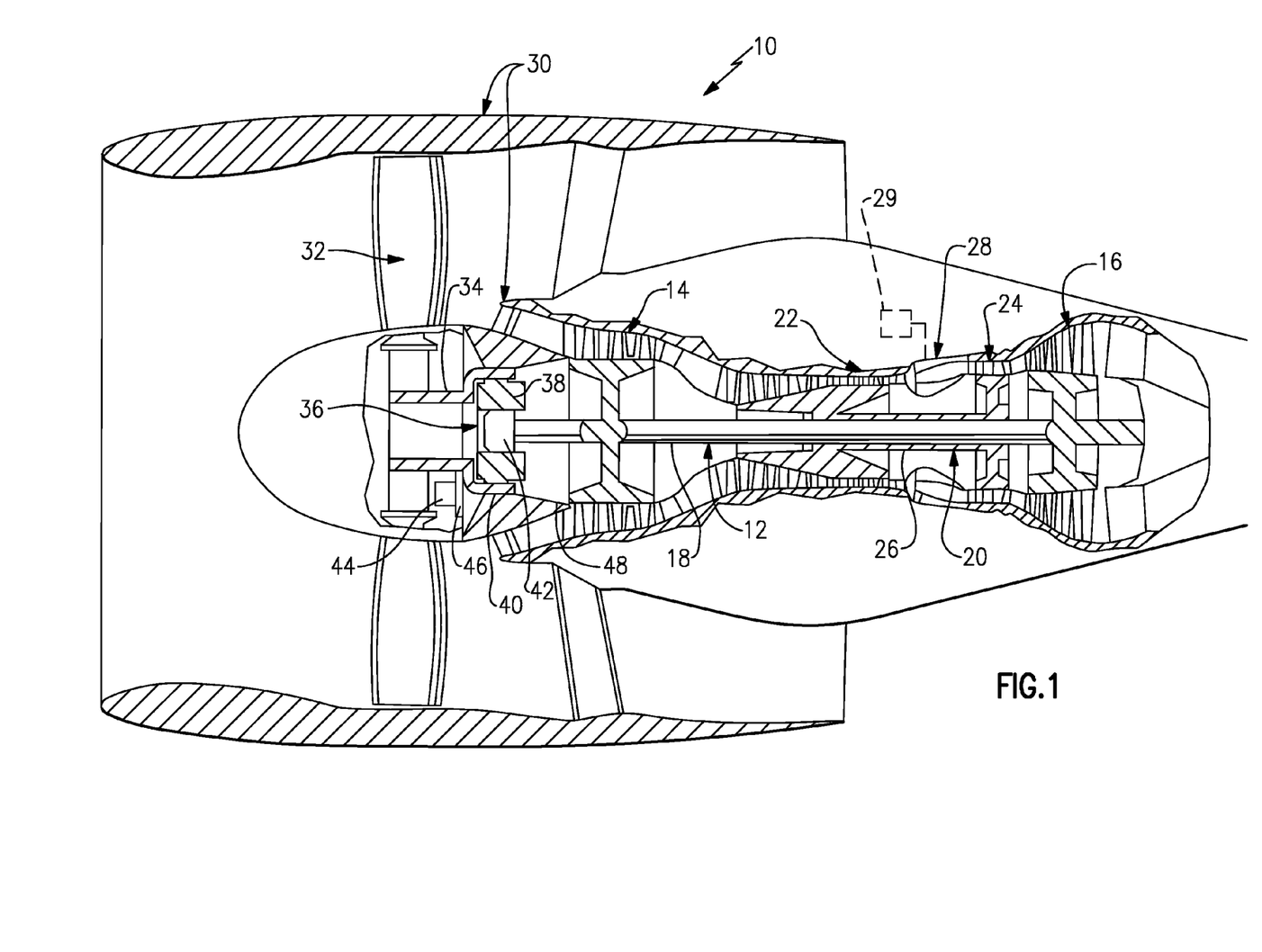
FIG. 1 is a schematic cross-sectional side view of a gas turbine engine with a fan drive gear system.

FIG. 1 is a schematic cross-sectional side view of gas turbine engine 10. Gas turbine engine 10 includes low pressure spool 12 (which includes low pressure compressor 14 and low pressure turbine 16 connected by low pressure shaft 18), high pressure spool 20 (which includes high pressure compressor 22 and high pressure turbine 24 connected by high pressure shaft 26), combustor 28, fuel pump 29, nacelle 30, fan 32, fan shaft 34, and fan drive gear system 36 (which includes star gear 38, ring gear 40, and sun gear 42). The general construction and operation of gas turbine engines is well-known in the art, and therefore detailed discussion here is unnecessary. However, a more detailed understanding of fan drive gear system 36 can be helpful.

As shown in FIG. 1, low pressure spool 12 is coupled to fan shaft 34 via fan drive gear system 36. In the illustrated embodiment, fan drive gear system 36 is a "star gear system". Sun gear 42 is attached to and rotates with low pressure shaft 18. Ring gear 40 is rigidly connected to fan shaft 34 which turns at the same speed as fan 32. Star gear 38 is coupled between sun gear 42 and ring gear 40 such that star gear 38 revolves about its axis, when sun gear 42 rotates. When low pressure spool 12 rotates, fan drive gear system 36 causes fan shaft 34 to rotate at a slower rotational velocity than that of low pressure spool 12. This allows fan 32 and low pressure spool 12 to rotate at different speeds for improved operation of both of fan 32 and low pressure spool 12. In an alternative embodiment, fan drive gear system 36 can be a "planetary gear system". In a planetary gear system, ring gear 40 is fixed and fan shaft 34 is attached to a carrier (not shown) that carries star gear 38 (also called a planet gear). Star gear 38 orbits about sun gear 42 as it spins between sun gear 42 and ring gear 40. Other fan drive gear systems may also be employed.

Pump 44 is coupled to and is driven by fan shaft 34 via pump gear 46 such that pump 44 can operate whenever fan shaft 34 is rotating. Pump 44 supplies fluid to lubricate gears and bearings of fan drive gear system 36. Fan drive gear system 36 benefits from a relatively continuous supply of lubricating fluid whenever fan shaft 34 is rotating. At least some of the fluid supplied to fan drive gear system 36 drains to sump 48 and is eventually pumped back through pump 44. In an alternative embodiment, pump 44 can be an electrically driven oil pump.

Figure 2:
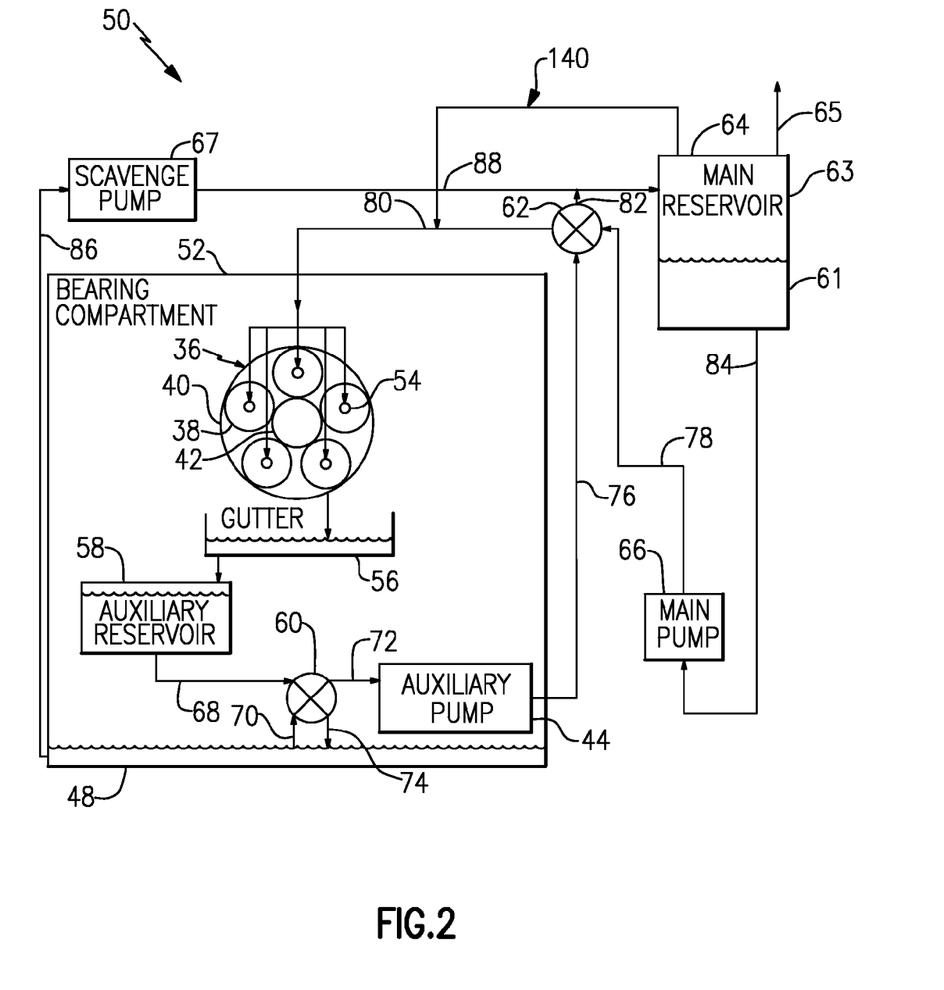
FIG. 2 is a schematic view of a pump system for the example gas turbine engine.

FIG. 2 is a schematic view of pump system 50. Pump system 50 includes bearing compartment 52 having a compartment cavity that contains fan drive gear system 36 (including bearings 54), auxiliary pump 44, gutter 56, auxiliary reservoir 58, and first shuttle valve 60. Pump system 50 also includes second shuttle valve 62, main reservoir 64, main pump 66, and scavenge pump 67 positioned outside of bearing compartment 52. Passages 68, 70, 72, 74, 76, 78, 80, 82, 84, 86, and 88, referred to interchangeably as passages and passage segments, connect the various components as illustrated and as further described, below.

As fan drive gear system 36 spins, lubricating fluid drips or flies off fan drive gear system 36 into bearing compartment 52 in different directions. A portion of that fluid is caught and collected by gutter 56 and funneled to auxiliary reservoir 58. During normal operating conditions, auxiliary reservoir 58 is kept substantially full of fluid for later use. In one embodiment, auxiliary reservoir 58 contains enough fluid to provide adequate lubrication for fan drive gear system 36 for at least 10 seconds. Gutter 56 does not collect all fluid leaving fan drive gear system 36. The remaining fluid that is not collected by gutter 56 falls to sump 48, which is an open-top reservoir at a bottom of bearing compartment 52. Bearing compartment 52 can be sealed to reduce fluid flow out of bearing compartment 52, except through designated passages as herein described.

First shuttle valve 60 is fluidly connected to auxiliary reservoir 58 via passage 68, to sump 48 via passage 70, to auxiliary pump 44 via passage 72, and again to sump 48 via passage 74. First shuttle valve 60 selectively directs fluid flow from auxiliary reservoir 58 or sump 48 to auxiliary pump 44 in a manner further described below with respect to FIGS. 3A and 3B.

Second shuttle valve 62 is fluidly connected to auxiliary pump 44 via passage 76, to main pump 66 via passage 78, to bearings 54 via passage 80, and to main reservoir 64 via passages 82 and 88. In the illustrated embodiment, passage 76 is an auxiliary supply passage and passage 78 is a main supply passage. Second shuttle valve 62 selectively directs fluid flow from auxiliary pump 44 or main pump 66 to bearings 54 in a manner further described below with respect to FIGS. 4A and 4B. Main reservoir 64 is further connected to main pump 66 through passage 84. Scavenge pump 67 is connected to sump 48 via passage 86 and to main reservoir 64 via passage 88. Scavenge pump 67 pumps a portion of the fluid in sump 48 to main reservoir 64 for use by main pump 66. It should be appreciated that passages 84, 78 and 80, can be referred to as passage segments that, collectively, form a main supply passage between the main reservoir and the bearing compartment during normal conditions.

As part of pump system 50, first shuttle valve 60 and second shuttle valve 62 work together as a valve system. This valve system directs lubricating fluid to bearings 54 from one of sump 48, auxiliary reservoir 58, or main reservoir 64. The pump system selects among these potential sources of lubricating fluid based upon sensed engine operating conditions.

Figure 3A:
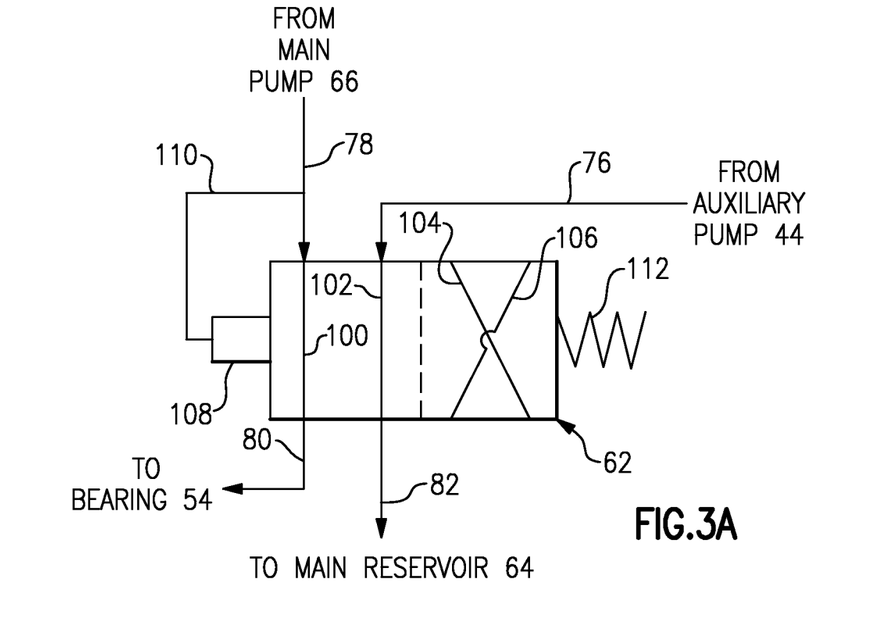
FIG. 3A is a schematic view of a second shuttle valve in a first position.

FIG. 3A is a schematic view of second shuttle valve 62 in a first position. Second shuttle valve 62 includes valve passages 100, 102, 104, and 106, sensor 108, sensor passage 110, and spring 112. In the first position, valve passage 100 is aligned with passages 78 and 80 to direct flow from main pump 66 to bearings 54. Valve passage 102 is aligned with passages 76 and 82 to direct flow from auxiliary pump 44 to passage 88 which is connected to main reservoir 64. In an alternative embodiment, passage 82 can be connected directly to main reservoir 64, bypassing passage 88. In yet another embodiment, passage 82 can be connected to sump 48 instead of main reservoir 64. In the illustrated embodiment, valve passages 104 and 106 are not aligned with any exterior passages. Valve passages 104 and 106 are, effectively, unused in the first position.

Sensor 108 can be one of a variety of sensors for sensing an engine operating condition such as pressure. Sensor 108 is connected to second shuttle valve 62 for actuating second shuttle valve 62 between first and second positions based upon the sensed engine operating condition. Sensor 108 is also fluidly connected to passage 78, through sensor passage 110, to sense pressure in passage 78. When sensor 108 senses pressure in passage 78 exceeding a threshold, it provides a force greater than that of spring 112, actuating second shuttle valve 62 into the first position and compressing spring 112. Second shuttle valve 62 can be actuated mechanically, electronically, or a combination of mechanically and electronically.

Figure 3B:
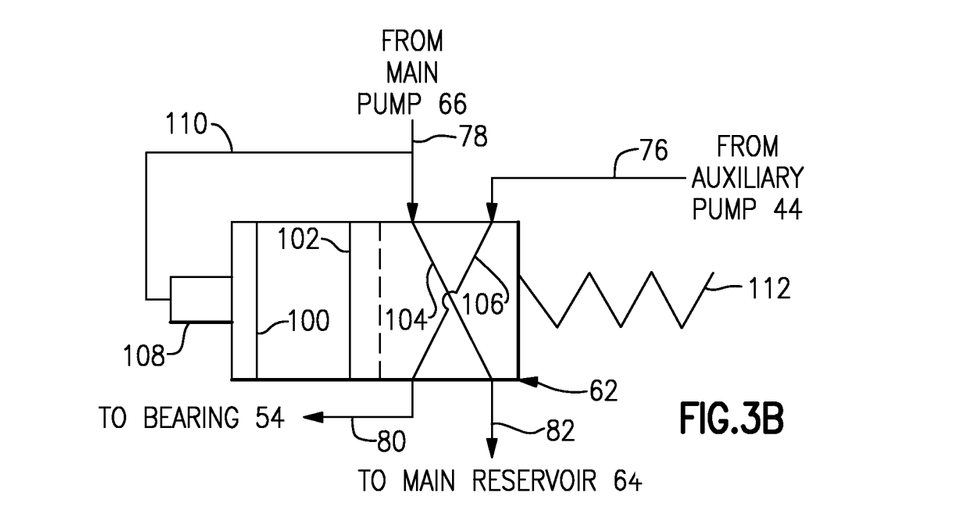
FIG. 3B is a schematic view of the second shuttle valve in a second position.

FIG. 3B is a schematic view of second shuttle valve 62 in a second position. When sensor 108 senses the pressure in passage 78 below the threshold, it provides a force less than that of spring 112. Thus, spring 112 can extend and actuate second shuttle valve 62 into the second position. In the second position, valve passages 100 and 102 are no longer aligned with any exterior passages and are, effectively, unused. Valve passage 104 is aligned with passages 78 and 82 to direct flow from main pump 66 to main reservoir 64. Valve passage 106 is aligned with passages 76 and 80 to direct flow from auxiliary pump 44 to bearings 54. In an alternative embodiment, passage 78 need not be connected to passage 82. Instead, valve passage 104 could be replaced with a valve passage ending (a dead-head) to reduce flow.

Under normal operating conditions, main pump 66 can supply adequate fluid for lubricating most components in gas turbine engine 10, including fan drive gear system 36 and bearing 54. When main pump 66 is supplying adequate fluid, pressure in passage 78 is above a threshold. Sensor 108 senses that pressure and actuates second shuttle valve 62 to the first position so long as the pressure is above the threshold. In the first position, main pump 66 supplies fluid to bearing 54. Fluid from auxiliary pump 44 is not needed at that time. Consequently, fluid from auxiliary pump 44 is directed to main reservoir 64 by second shuttle valve 62 in the first position.

If, however, sensor 108 senses that pressure in passage 78 is below the threshold, that indicates that main pump 66 may not be supplying adequate fluid to bearings 54. Then sensor 108 exerts a reduced force on second shuttle valve 62, allowing spring 112 to expand and actuate second shuttle valve 62 to the second position. In the second position, auxiliary pump 44 supplies fluid to bearings 54. Main pump 66 is then connected to main reservoir 64 through passage 82 to direct any fluid that is still being pumped through passage 78 back to main reservoir 64. Second shuttle valve 62 remains in the second position unless and until pressure in passage 78 exceeds the threshold again.

In one embodiment, bearings 54 are journal bearings. Journal bearings can benefit from having a supply of substantially continuous lubricating fluid. Consequently, bearings 54 can benefit from having fluid supplied from auxiliary pump 44 when engine operating conditions prevent main pump 66 from supplying adequate fluid. This benefit depends on auxiliary pump 44 having an adequate supply of fluid during those engine operating conditions.

Figure 4A:
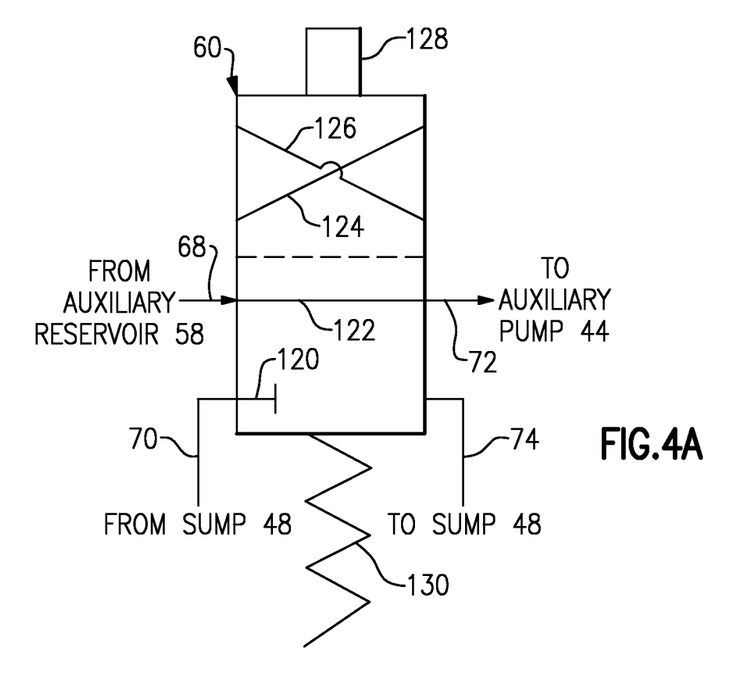
FIG. 4A is a schematic view of a first shuttle valve in a first position.

FIG. 4A is a schematic view of first shuttle valve 60 in a first position. First shuttle valve 60 includes valve passage ending 120, valve passages 122, 124, and 126, sensor 128, and spring 130. In the first position, valve passage ending 120 is aligned with passage 70 to reduce or prevent flow from sump 48. In an alternative embodiment, valve passage ending 120 could be replaced with a valve passage aligned with and connecting passages 70 and 74. Valve passage 122 is aligned with passages 68 and 72 to direct flow from auxiliary reservoir 58 to auxiliary pump 44. Valve passages 124 and 126 are not aligned with any exterior passages. Valve passages 124 and 126 are, effectively, unused in the first position. The ultimate effect of the first position is to supply fluid from auxiliary reservoir 58 to auxiliary pump 44.

Sensor 128 can be one of a variety of sensors for sensing an engine operating condition. Sensor 128 is connected to first shuttle valve 60 for actuating first shuttle valve 60 between first and second positions based upon the sensed engine operating condition. When sensor 128 senses the sensed engine operating condition having a value in a first range, it provides a force less than that of spring 130, allowing spring 130 to extend and actuate first shuttle valve 60 into the first position. First shuttle valve 60 can be actuated mechanically, electronically, or a combination of mechanically and electronically.

Figure 4B:
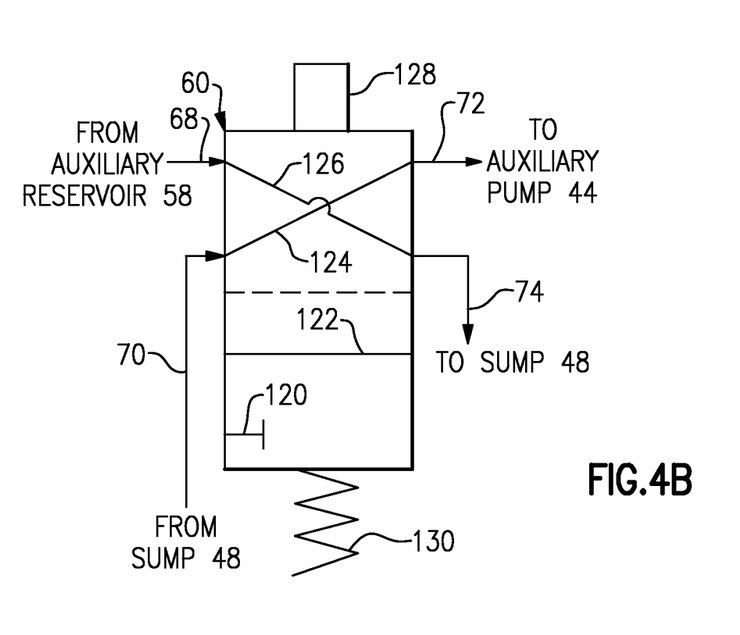
FIG. 4B is a schematic view of the first shuttle valve in a second position.

FIG. 4B is a schematic view of first shuttle valve 60 in a second position. When sensor 128 senses the sensed operating condition having a value in a second range, it provides a force greater than that of spring 130, actuating first shuttle valve 60 into the second position and compressing spring 130. In the second position, valve passage ending 120 and valve passage 122 are no longer aligned with any exterior passages and are, effectively, unused. Valve passage 124 is aligned with passages 70 and 72 to direct flow from sump 48 to auxiliary pump 44. Valve passage 126 is aligned with passages 68 and 74 to direct flow from auxiliary reservoir 68 to sump 74. The ultimate effect of the second position is to dump excess fluid from auxiliary reservoir 58 to sump 48 and to supply fluid from sump 48 to auxiliary pump 44.

In one embodiment, sensor 128 can be a gravity sensor, such as a simple weight connected to first shuttle valve 60, and the sensed engine condition can be gravity. When gravitational forces acting on sensor 128 are below a threshold, such as zero and negative gravity conditions, the weight of sensor 128 is reduced, and spring 130 can extend such that first shuttle valve 60 is in the first position as illustrated in FIG. 4A. When gravitational forces acting on sensor 128 exceed a threshold, such as normal gravity conditions, the weight of sensor 128 can push down on first shuttle valve 60, compressing spring 130, such that first shuttle valve 60 is in the second position as illustrated in FIG. 4B. In an alternative embodiment, spring 130 can be omitted, and first shuttle valve 60 can be actuated solely by sensor 128.

Normal gravity conditions can occur when gravity is positive, such as when gas turbine engine 10 is parked on the ground, flying level, ascending, or gradually descending. Negative and zero gravity conditions can occur when gravity is sensed to be approximately zero or negative, such as when gas turbine engine 10 is upside down, accelerating toward the Earth at a rate equal to or greater than the rate of gravity, or decelerating at the end of a vertical ascent.

Under zero and negative gravity conditions, fluid in sump 48 and main reservoir 64 can rise to their respective tops, interrupting supply to passages 70 and 84, respectively. On the other hand, auxiliary reservoir 58 is kept substantially full of lubricating fluid and is adapted to supply that fluid during negative gravity conditions. In one embodiment, however, auxiliary reservoir 58 only holds enough fluid to supply for a limited amount of time, such as about 10 seconds. Auxiliary reservoir 58 does not collect fluid fast enough to supply the fluid for long durations. Thus, first shuttle valve 60 supplies fluid from sump 48 to auxiliary pump 44, under ordinary gravity conditions, which is most of the time. First shuttle valve 60 then switches and supplies from auxiliary reservoir 58 only for brief periods of zero or negative gravity.

Using first shuttle valve 60 in combination with second shuttle valve 62 can provide substantially continuous fluid to bearings 54. As described above with respect to FIGS. 3A and 3B, second shuttle valve 62 directs fluid from auxiliary pump 44 to bearings 54 when main pump 66 does not supply adequate fluid. If main pump 66 is not supplying adequate fluid due to zero or negative gravity conditions, then first shuttle valve 60 directs fluid from auxiliary reservoir 58 to bearings 54. If, however, main pump 66 is not supplying adequate fluid due to some reason other than negative gravity conditions, then first shuttle valve 60 directs fluid from sump 48 to bearings 54.

Figure 5A:
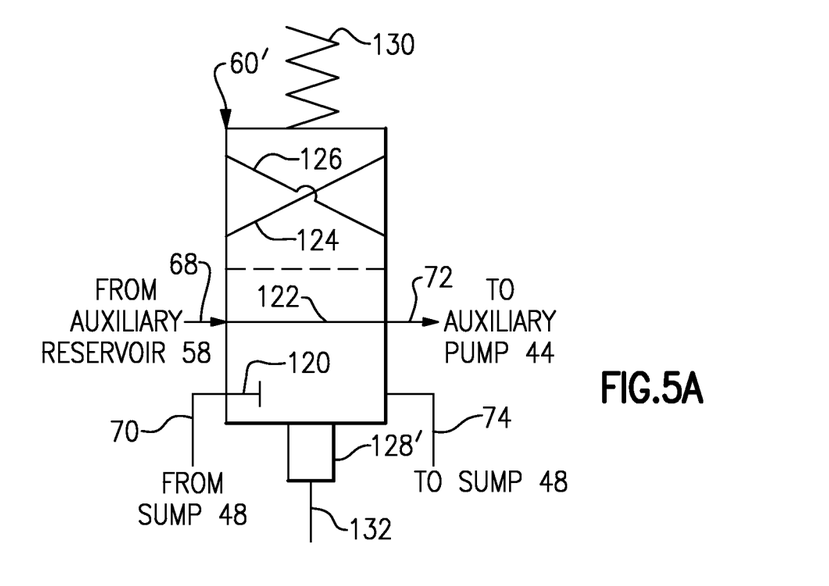
FIG. 5A is a schematic view of another embodiment of the first shuttle valve in a first position.

FIG. 5A is a schematic view of a different embodiment of first shuttle valve 60' in a first position. First shuttle valve 60' includes valve passage ending 120, valve passages 122, 124, and 126, sensor 128', spring 130, and sensor passage 132. In the first position, valve passage ending 120 is aligned with passage 70 to reduce or prevent flow from sump 48. Valve passage 122 is aligned with passages 68 and 72 to direct flow from auxiliary reservoir 58 to auxiliary pump 44. Valve passages 124 and 126 are not aligned with any exterior passages. Valve passages 124 and 126 are, effectively, unused in the first position.

Sensor 128' can be one of a variety of sensors for sensing an engine operating condition. Sensor 128' is connected to first shuttle valve 60' for actuating first shuttle valve 60' between first and second positions based upon the sensed engine operating condition. When sensor 128' senses the sensed engine operating condition exceeding a threshold, it provides a force greater than that of spring 130, actuating first shuttle valve 60' into the first position and compressing spring 130.

Figure 5B:
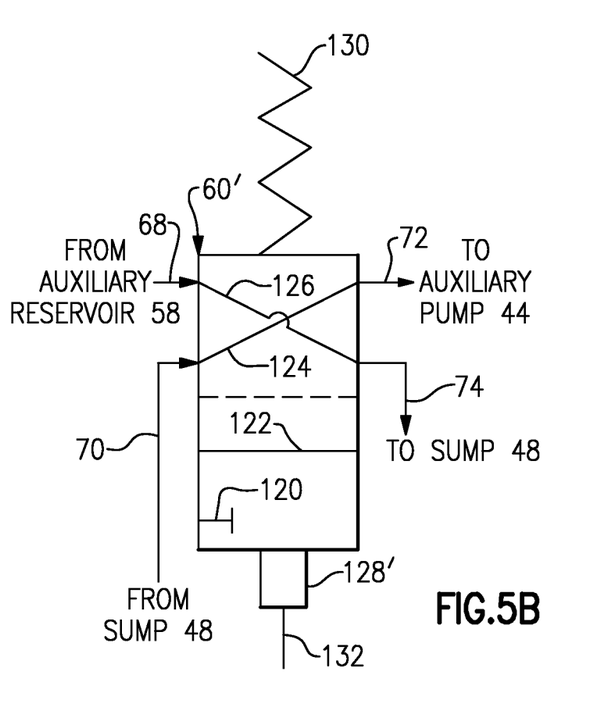
FIG. 5B is a schematic view of another embodiment of the first shuttle valve in a second position.

FIG. 5B is a schematic view of first shuttle valve 60' in a second position. When sensor 128' senses the sensed operating condition below the threshold, it provides a force less than that of spring 130. Thus, spring 130 can expand and actuate first shuttle valve 60' into the second position. In the second position, valve passage ending 120 and valve passage 122 are no longer aligned with any exterior passages and are, effectively, unused. Valve passage 124 is aligned with passages 70 and 72 to direct flow from sump 48 to auxiliary pump 44. Valve passage 126 is aligned with passages 68 and 74 to direct flow from auxiliary reservoir 68 to sump 74.

First shuttle valve 60' as illustrated in FIGS. 5A and 5B is substantially similar to first shuttle valve 60 as illustrated in FIGS. 4A and 4B except for two differences. The first difference is that sensor 128' swaps positions with spring 130. Thus, spring 130 is compressed when first shuttle valve 60' is in the first position, whereas spring 130 is extended when first shuttle valve 60 is in the first position. The second difference is a difference between sensor 128' and sensor 128.

Sensor 128' as illustrated in FIGS. 5A and 5B is a buffer pressure reference sensor and the sensed operating condition is pressure. Sensor 128' is fluidly connected to a component in gas turbine engine 10, through sensor passage 132, for sensing pressure at that component. When sensor 128' senses pressure exceeding a threshold, it provides a force greater than that of spring 130, actuating first shuttle valve 60' into the first position and compressing spring 130. When sensor 128' senses the pressure below the threshold, it provides a force less than that of spring 130, allowing spring 130 to extend and actuate first shuttle valve 60' into the second position.

Pressure sensed by sensor 128' can be one of a variety of pressures related to gas turbine engine 10. In one embodiment, the pressure is air pressure downstream of high pressure compressor 22. In another embodiment, the pressure is fuel pressure downstream of fuel pump 29. In yet another embodiment, the pressure is lubricating fluid pressure downstream of auxiliary pump 44. In each of these embodiments, pressure is measurably higher when high pressure spool 20 is rotating at operating speed than when high pressure spool 20 is rotating below operating speed. In still other embodiments, the pressure sensed by sensor 128' can be virtually any pressure that is measurably higher when high pressure spool 20 is rotating at operating speed than when high pressure spool 20 is rotating below operating speed.

Rotational speed of high pressure spool 20 is important because main pump 66 is driven by high pressure spool 20. If high pressure spool 20 rotates slower than operating speed or even stops, then main pump 66 will pump a reduced amount of fluid. In some situations, fan 32 can continue rotating at relatively high speeds when high pressure spool 20 rotates slowly or even stops. This can occur when gas turbine engine 10 is shut down but air still flows across fan 32, such as during an in-flight engine shut-down or when gas turbine engine 10 is on the ground and fan 32 is "windmilling". Speed of high pressure spool 20 is also an indicator of whether gas turbine engine 10 is operating, overall.

Using first shuttle valve 60' in combination with second shuttle valve 62 can also provide substantially continuous fluid to bearings 54. As described above with respect to FIGS. 3A and 3B, second shuttle valve 62 directs fluid from auxiliary pump 44 to bearings 54 when main pump 66 does not supply adequate fluid. If main pump 66 is not supplying adequate fluid due to slow rotation of high pressure spool 20, then sensor 128' can sense pressure below a threshold and first shuttle valve 60' can direct fluid from sump 48 to bearings 54. This allows fluid to be supplied to bearings 54 for an extended period of time of windmilling. If, however, high pressure spool 20 is not rotating slowly, then sensor 128' can sense pressure above the threshold and first shuttle valve 60' can direct fluid from auxiliary pump 68 to bearings 54. This allows fluid to be supplied to bearings 54 for a brief period of zero or negative gravity conditions. This can be beneficial because an interruption in supply from main pump 66 when high pressure spool 20 is rotating at operating speed is most likely due to zero or negative gravity conditions.

Thus, pump system 50, including the valve system combining either first shuttle valve 60 or first shuttle valve 60' with second shuttle valve 62, can provide substantially continuous fluid to bearing 54 under a variety of engine operating conditions. This is done by selecting an appropriate source of fluid depending on the conditions.

Additional passages may be provided to better ensure that fluid is provided to the bearing compartment 52 under negative gravity conditions in which fluid may be at the top of the main reservoir 64. Returning to FIG. 2, the pump system 50 includes a supply passage 140 that fluidly connects the main reservoir to the passage 80. The main reservoir 64 includes a lower portion 61 that holds the lubrication fluid during positive gravity conditions. The fluid in the lower portion 61, connected to the passage 80 via passage 84, supplies a steady amount of fluid to the main pump 66, which supplies the bearing compartment 52 with fluid through the passage 80. A vent 65 permits air to escape the main reservoir 64 during positive gravity conditions. During a negative gravity condition, the fluid within the main reservoir 64 floats to an upper portion 63, connected to the supply passage 140, such that the main pump 66 is starved of lubrication fluid. In this negative gravity condition, the fluid in the upper portion 63 flows through the supply passage 140 to supply fluid to the passage 80 and the bearing compartment 52.

It is desirable to maintain normal flow through the passage 80 during positive gravity conditions. In the example illustrated in FIG. 6, a check valve 142 blocks fluid flow from the main reservoir 64 during positive gravity conditions. A housing 144 includes an inlet 146 that is in fluid communication with the main reservoir 64. The housing 144 also includes an outlet 148 connected to the supply passage 140. In one example, the housing 144 is part of the vent 65.

Figure 6:
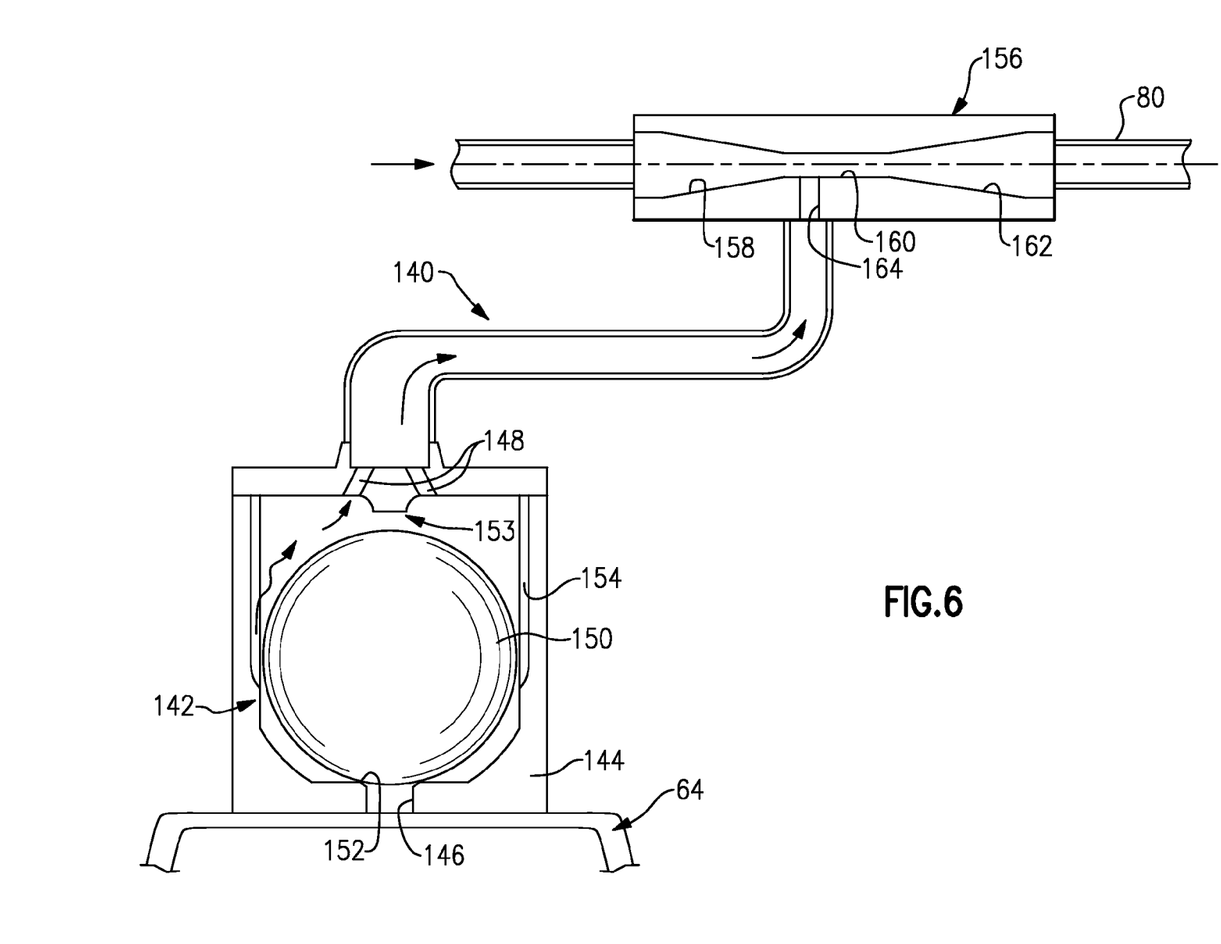
FIG. 6 is a schematic view of a portion of the pump system having a check valve that provides lubrication fluid to the bearing compartment during a negative gravity condition.

A ball 150 is arranged within the housing 144 against a seat 152 to block the inlet 146 in positive gravity conditions. In one example, the ball 150 is positioned against the seat 152 from the weight of the ball 150 without an additional biasing element. Under negative gravity conditions, the ball 150 floats upward in the housing 144 against a stop 153. In this position, fluid is permitted to flow from the main reservoir 64 past the ball 150 and through slots 154 within the housing 144 to an outlet 148. The outlet 148 is in fluid communication with the passage 80.

In systems in which the pressure within the main reservoir 64 is not sufficient to cause the fluid to flow from the main reservoir 64 to the passage 80, an ejector 156 may be provided in the passage 80. The ejector 156 includes a converging portion 158 connected to a diverging portion 162 by a throat 160. An inlet 164 provides fluid communication between the supply passage 140 and the throat 160. Fluid flow through the ejector 156, whether air or liquid, draws the oil from the supply passage 140 into the passage 80. However, the ejector 156 does not create vacuum sufficient to pull the ball 150 from the seat 152 without the assistance of a negative gravity condition.

Figure 7A:
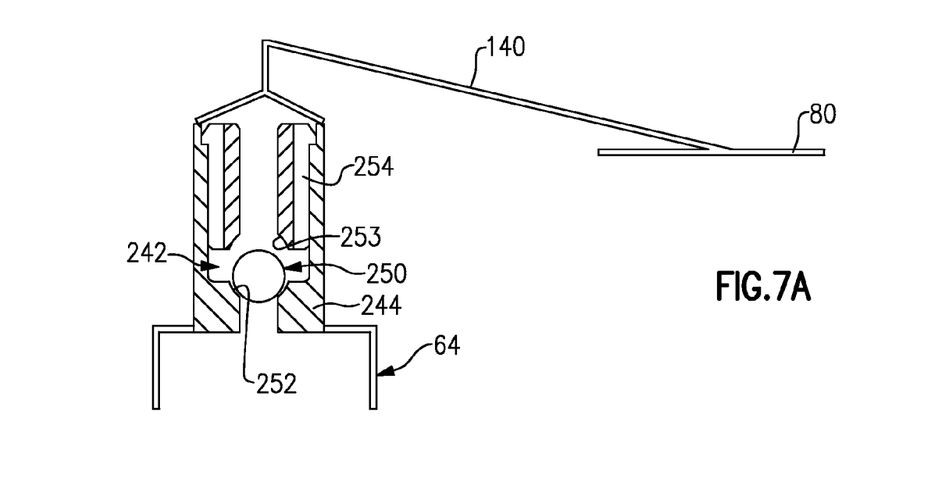
FIG. 7A schematically depicts another check valve during a positive gravity condition.
Figure 7B:
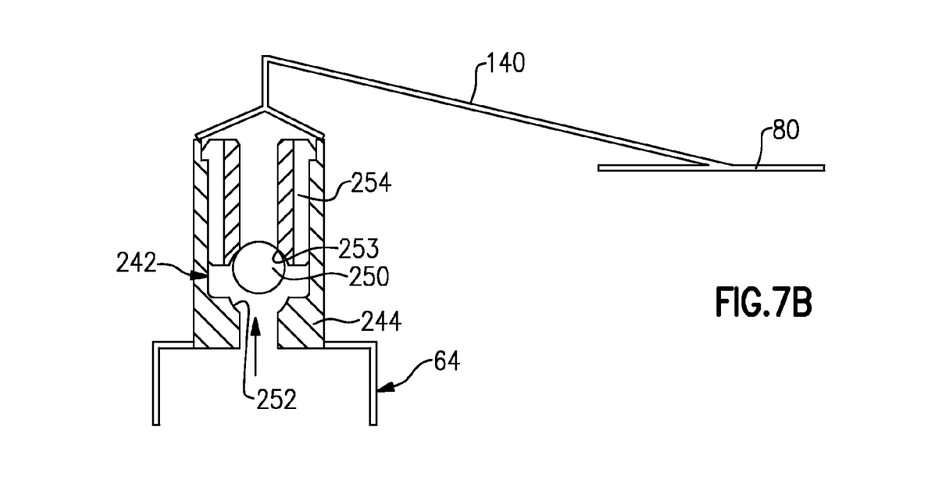
FIG. 7B schematically depicts the check valve of FIG. 7A in a negative gravity condition.

Referring to FIGS. 7A and 7B, another example check valve 242 is illustrated. FIG. 7A illustrates the check valve 242 in the positive gravity condition in which the ball 250 is seated against a lower seat 252 within the housing 244. During a negative gravity condition, as shown in FIG. 7B, the ball 250 moves upward against an upper seat 253 to permit the fluid from the main reservoir 64 to flow past the ball 250 and through slots 254 to supply the fluid to the passage 80 through the supply passage 140.

Figure 8:
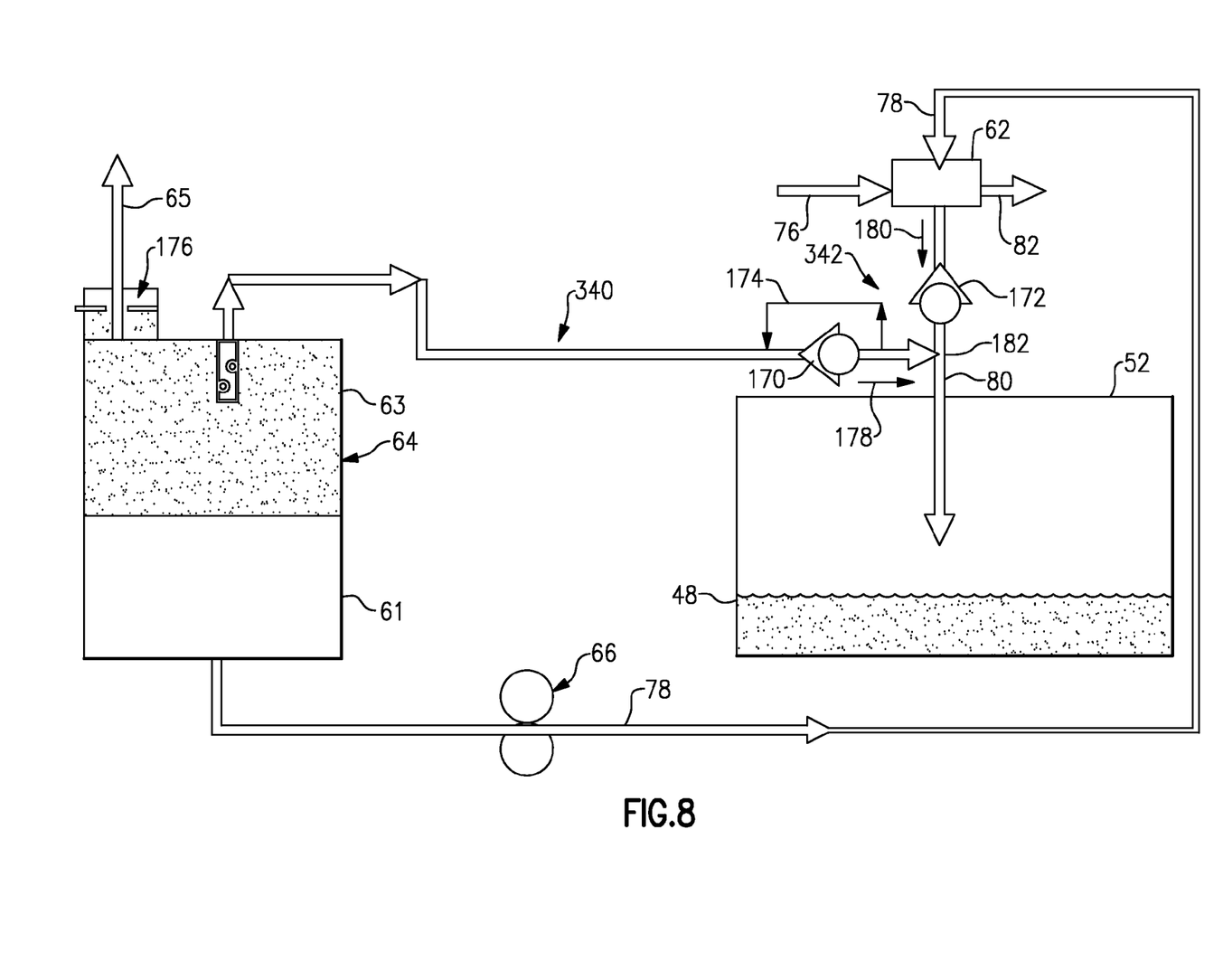
FIG. 8 is a schematic view of another example fluid supply system for a negative gravity condition.

Another example check valve arrangement 342 is illustrated in FIG. 8. The supply passage 340 includes a first check valve 170 that permits fluid to flow from the upper portion 63 of the main reservoir 64 in a negative gravity condition in a first flow direction 178. The first check valve 170 may include an element that is spring biased to a closed position during the positive gravity condition to prevent flow in the first flow direction 178.

A second check valve 172 is arranged in the passage 80 upstream from an intersection 182 between the supply passage 340 and the passage 80. The fluid flows past the second check valve 172 in a second direction 180 during the positive gravity condition. The second check valve 172 is open during a positive gravity condition to permit the main pump 66 to pump fluid from the lower portion 61 of the main reservoir 64 through the shuttle valve 62 to the bearing compartment 52. During the positive gravity condition, a bleed passage 174 permits a small amount of fluid to bypass the first check valve 170 to fill the supply passage 340. As a result, in the negative gravity condition, oil will begin to immediately flow from the main reservoir 64 to the bearing compartment 52 through the supply passage 340.

The main reservoir 64 includes vent 65, which includes a pressure valve 176 configured to maintain a desired pressure within the main reservoir 64 in the example, unlike the arrangements illustrated in FIGS. 6-7B. In one example, the pressure valve 176 is configured to maintain at least between 20-30 psia (137.90-206.84 kPa) in the main reservoir 64. This main reservoir pressure is sufficient to open the spring-biased first check valve 170, as the pressure in the passage 80 drops due to a lack of fluid, without the need of an ejector in the supply passage 80.

Although an example embodiment has been disclosed, a worker of ordinary skill in this art would recognize that certain modifications would come within the scope of the claims. For that reason, the following claims should be studied to determine their true scope and content.

What is claimed is:

1. A lubrication system for a gas turbine engine comprising:
   a bearing compartment;
   a main reservoir fluidly connected to the bearing compartment by a main supply passage, which includes one or more passage segments therein;
   a main pump arranged in the main supply passage configured to draw fluid from the main reservoir and provide the fluid to the bearing compartment during a positive gravity condition;
   an auxiliary reservoir;
   an auxiliary pump fluidly connected between the auxiliary reservoir and the bearing compartment via an auxiliary passage; and
   a secondary supply passage fluidly connecting the main reservoir to at least one segment of the main supply passage, thereby providing fluid from the main reservoir to the bearing compartment during a negative gravity condition, wherein the main reservoir includes upper and lower portions, the main supply passage in fluid communication with the lower portion, and the secondary supply passage in fluid communication with the upper portion, wherein fluid from the main pump is configured to reach the bearing compartment before reaching the auxiliary reservoir.

2. The system according to claim 1, comprising a first check valve arranged in the secondary supply passage fluidly between the main reservoir and the main supply passage.

3. The system according to claim 2, comprising a bleed passage fluidly connected to the secondary passage and configured to bypass the first check valve.

4. The system according to claim 2, wherein the main reservoir includes a vent having a pressure valve configured to maintain a desired pressure in the main reservoir and open the first check valve in the negative gravity condition.

5. The system according to claim 4, wherein the desired pressure is at least 20 psia (137.90 kPa).

6. The system according to claim 2, comprising a second check valve in the main supply passage and arranged upstream from an intersection of the main supply passage with the secondary supply passage.

7. The system according to claim 1, wherein the bearing compartment includes a sump, and a scavenge pump fluidly connecting the sump to the main reservoir.

8. The system according to claim 1, comprising a shuttle valve interconnecting the auxiliary passage and the main supply passage and arranged upstream from the auxiliary and main pumps.

9. The system according to claim 1, comprising a check valve provided in the main reservoir movable in response to the positive and negative gravity conditions.

10. The system according to claim 1, wherein the main supply passage includes an ejector fluidly connected to the secondary supply passage at an ejector throat.

* * * * *